(12) United States Patent
Yen

(10) Patent No.: US 9,084,188 B2
(45) Date of Patent: Jul. 14, 2015

(54) CARRIER AGGREGATION WIRELESS NETWORK SYSTEM AND BASE STATION, WIRELESS COMMUNICATION DEVICE, AND SYNCHRONIZATION METHOD THEREOF

(75) Inventor: Chia-Pang Yen, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 19 days.

(21) Appl. No.: 13/585,842

(22) Filed: Aug. 15, 2012

(65) Prior Publication Data

US 2013/0044686 A1 Feb. 21, 2013

Related U.S. Application Data

(60) Provisional application No. 61/523,833, filed on Aug. 15, 2011.

(30) Foreign Application Priority Data

Jul. 20, 2012 (TW) .............................. 101126298 A

(51) Int. Cl.
*H04W 4/00* (2009.01)
*H04W 56/00* (2009.01)
(Continued)

(52) U.S. Cl.
CPC ........... *H04W 56/00* (2013.01); *H04L 27/2613* (2013.01); *H04L 27/2662* (2013.01); *H04L 5/001* (2013.01)

(58) Field of Classification Search
CPC . H04W 80/04; H04W 84/12; H04W 72/0446; H04W 88/08; H04W 56/00
USPC ................. 370/328, 329, 350, 331, 330, 341; 455/450, 452.2, 464, 509
See application file for complete search history.

(56) References Cited

U.S. PATENT DOCUMENTS

| 8,107,493 | B2 | 1/2012 | Kwon et al. |
| 8,665,799 | B2 * | 3/2014 | Malladi et al. ................ 370/329 |
| 2008/0095108 | A1 | 4/2008 | Malladi et al. |

FOREIGN PATENT DOCUMENTS

| CN | 101548516 | 9/2009 |
| CN | 102118801 | 7/2011 |
| TW | 201208426 | 2/2012 |

OTHER PUBLICATIONS

3GPP TS 36.211, "3rd Generation Partnership Project; Technical Specification Group Radio Access Network; Evolved Universal Terrestrial Radio Access (E-UTRA); Physical Channels and Modulation (Release 10)", 3GPP, V10.5.0, Jun. 2012, pp. 1-101.

(Continued)

*Primary Examiner* — Chi H Pham
*Assistant Examiner* — Alexander O Boakye
(74) *Attorney, Agent, or Firm* — Jianq Chyun IP Office

(57) ABSTRACT

A carrier aggregation wireless network system and a base station (BS), a wireless communication device, and a synchronization method thereof are disclosed. The wireless communication device receives a wireless signal from the BS. The wireless signal includes a primary cell (pcell) and a secondary cell (scell). A subframe of the scell includes a first OFDM symbol and a second OFDM symbol. The first OFDM symbol includes an extended primary synchronization signal (PSS). The second OFDM symbol includes a PSS. The scell includes a secondary synchronization signal (SSS). The wireless communication device acquires synchronization according to the extended PSS and/or the PSS. In addition, the wireless communication device may also acquire synchronization according to a cell ID, the PSS, and the SSS.

12 Claims, 5 Drawing Sheets

(51) Int. Cl.
*H04L 27/26* (2006.01)
*H04L 5/00* (2006.01)

(56) References Cited

OTHER PUBLICATIONS

R1-100061, "On technical aspects on Heterogeneous Networks," Ericsson, ST-Ericsson, 3GPP TSG-RAN WG1 #59bis, Jan. 18-22, 2010, pp. 1-4.
RP-110535, "Status report to TSG—Carrier Aggregation for LTE—core part", D04',TSG RAN meeting #52, May 31-Jun. 3, 2011, pp. 1-12.
R1-11xxxx, "Draft report of 3GPP TSG RAN WG1 #65 v0.1.0", MCC Support, 3GPP TSG RAN WG1 Meeting #66, Aug. 22-26, 2011, pp. 1-103.
R2-105223, "Report of 3GPP TSG RAN WG2 meeting #70bis, Stockholm, Sweden, Jun. 28-Jul. 2, 2010", ETSI MCC, 3GPP TSG-RAN Working Group 2 meeting #71, Aug. 23-27, 2010, pp. 1-137.
R1-111323, "Remaining details for CA based HetNet in Rel-10," Ericssion, ST-Ericssion, 3GPP TSG-RAN WG1 #65, May 9-13, 2011, pp. 1-3.
R1-111381, "Discussion on CA-based HetNet," Huawei, HiSilicon, 3GPP TSG RAN WG1 Meeting #65, May 9-13, 2011, pp. 1-3.
R1-112410, "CA-based Het Net operation", Alcatel-Lucent, Alcatel-Lucent Shanghai Bell, 3GPP TSG RAN WG1 Meeting #66, Aug. 22-26, 2011, pp. 1-3.
R1-112411, "Scenarios for Further Enhanced Non CA-based ICIC for LTE", Alcatel-Lucent, Alcatel-Lucent Shanghai Bell, 3GPP TSG RAN WG1 Meeting #66, Aug. 22-26, 2011, pp. 1-8.
R1-112543, "Scenarios for eICIC evaluations", Qualcomm Incorporated, 3GPP TSG-RAN WG1 #66, Aug. 22-26, 2011, pp. 1-8.
R1-112154, "System Performance Gains with Rel-10 ICIC and HetNet Enhancements for Rel-11", Texas Instruments, 3GPP TSG RAN WG1 Meeting #66, Aug. 22-26, 2011, pp. 1-10.
R1-112806, "Way Forward on Identification of Scenarios for feICIC", Alcatel-Lucent, et al., TSG-RAN WG1 Meeting #66, Aug. 22-26, 2011, pp. 1-6.
Damnjanovic et al., "A survey on 3GPP heterogeneous networks," IEEE Wireless Communications, Jun. 2011, pp. 10-21.
3GPP Technical Specification, "3rd Generation Partnership Project; Technical Specification Group Radio Access Network; Evolved Universal Terrestrial Radio Access (E-UTRA); Physical Channels and Modulation (Release 10)," 3GPP TS 36.211 V10.2.0, Jun. 2011, pp. 92-94.
"Office Action of Taiwan Counterpart Application", issued on Aug. 25, 2014, p1-p7.
"Office Action of China Counterpart Application", issued on Sep. 3, 2014, p1-p6.

* cited by examiner

CARRIER AGGREGATION WIRELESS NETWORK SYSTEM AND BASE STATION, WIRELESS COMMUNICATION DEVICE, AND SYNCHRONIZATION METHOD THEREOF

CROSS-REFERENCE TO RELATED APPLICATION

This application claims the priority benefits of U.S. provisional application Ser. No. 61/523,833, filed on Aug. 15, 2011 and Taiwan application serial no. 101126298, filed on Jul. 20, 2012. The entirety of each of the above-mentioned patent applications is hereby incorporated by reference herein and made a part of this specification.

TECHNICAL FIELD

The technical field relates to a synchronization technique in a carrier aggregation wireless network system, and more particularly, to a carrier aggregation wireless network system and a base station, a wireless communication device, and a synchronization method thereof.

BACKGROUND

In order to set up and provide a fast and convenient information transmission environment, people have been constantly developing and upgrading existing wireless networks (for example, mobile communication networks). In an orthogonal frequency-division multiplexing (OFDM) long term evolution (LTE) system, a carrier resource of no more than 20M is allocated to each user equipment (UE, also referred to as user device). However, to achieve a greater transmission bandwidth, 2 or more component carriers (CC) are aggregated. For example, carrier aggregation (including contiguous carrier aggregation and interband and intraband non-contiguous carrier aggregation) is supported in a LTE-advanced system to achieve a maximum aggregatable bandwidth of up to 100 MHz. Thus, 1-5 CCs may be allocated to a specific UE, and accordingly, resources used or collected by the UE may be distributed on these 1-5 CCs.

In a wireless network system (for example, a mobile communication network system), a base station (BS) is usually served as the access point of many wireless communication devices. Herein a wireless communication device may be a mobile station (MS, for example, a cell phone) or a user device (for example, a notebook computer). However, the MS may also be a user device and vice versa. A wireless communication device may be an immobile device (for example, a personal computer (PC)) or a mobile device (for example, a cell phone, a tablet PC, or any other mobile communication device).

Because each macro BS has a very large coverage area (also referred to as a macro coverage area) and supports a large number of wireless communication devices within its coverage area, each macro BS carries a heavy communication load. Besides, a macro BS is difficult to deploy due to environmental awareness and opposition. Additionally, because communication-starved spots may exist inside a building because of the deployed position of a BS or the shield of buildings or other objects, indoor communication quality may not be very satisfactory. Thus, the deployment of local or sub BSs (for example, pico BSs, femto BSs, and home BSs) has become a preferred solution for improving indoor communication performance.

A sub BS offers a low power, a great bandwidth, and a small sub coverage area therefore can improve the communication performance of any wireless communication device within its coverage area. However, because the coverage area of a macro BS and the coverage area of a sub BS often overlap each other, data transmitted within these two areas may interfere with each other. Moreover, the transmission performance of a macro BS may be affected by such interference or any issue regarding transmission resource allocation.

SUMMARY

The disclosure provides a synchronization method of a carrier aggregation wireless network system. The wireless network system includes a first base station (BS), a second BS, and a wireless communication device. A part of the coverage area of the first BS overlaps a part of the coverage area of the second BS. The synchronization method includes following steps. A first wireless signal is transmitted by the first BS. The first wireless signal includes a first subframe. The first subframe includes a first orthogonal frequency-division multiplexing (OFDM) symbol. The first OFDM symbol includes an extended primary synchronization signal (PSS). The extended PSS is sequentially a first periodic extension, a low-frequency part, a DC carrier, a high-frequency part, and a second periodic extension in order of increasing frequency on the spectrum. The DC carrier is a subcarrier located at the center of the baseband. The first periodic extension and the high-frequency part carry the same data. The second periodic extension and the low-frequency part carry the same data. A second wireless signal is transmitted by the second BS. The second wireless signal includes a second subframe. The second subframe includes a plurality of OFDM symbols. One of the OFDM symbols of the second subframe that is corresponding to the first OFDM symbol includes a PSS. The PSS is sequentially the low-frequency part, the DC carrier, and the high-frequency part in order of increasing frequency on the spectrum. The wireless communication device acquires synchronization according to the extended PSS.

The disclosure provides a carrier aggregation wireless network system including a first BS, a second BS, and a wireless communication device. The first BS transmits a first wireless signal. The first wireless signal includes a first subframe. The first subframe includes a first OFDM symbol. The first OFDM symbol includes an extended PSS. The extended PSS is sequentially a first periodic extension, a low-frequency part, a DC carrier, a high-frequency part, and a second periodic extension in order of increasing frequency on the spectrum. The DC carrier is a subcarrier located at the center of the baseband. The first periodic extension and the high-frequency part carry the same data. The second periodic extension and the low-frequency part carry the same data. The second BS transmits a second wireless signal. The second wireless signal includes a second subframe. The second subframe includes a plurality of OFDM symbols. One of the OFDM symbols of the second subframe that is corresponding to the first OFDM symbol includes a PSS. The PSS is sequentially the low-frequency part, the DC carrier, and the high-frequency part in order of increasing frequency on the spectrum. The wireless communication device acquires synchronization according to the extended PSS.

The disclosure provides a BS of a carrier aggregation wireless network system. The BS transmits a wireless signal. The wireless signal includes a subframe. The subframe includes a first OFDM symbol. The first OFDM symbol includes an extended PSS. The extended PSS is sequentially a first periodic extension, a low-frequency part, a DC carrier, a high-frequency part, and a second periodic extension in order of increasing frequency on the spectrum. The DC carrier is a subcarrier located at the center of the baseband. The first periodic extension and the high-frequency part carry the same data. The second periodic extension and the low-frequency part carry the same data.

The disclosure provides a wireless communication device of a carrier aggregation wireless network system. The wireless communication device receives a wireless signal. The wireless signal includes a subframe. The subframe includes a first OFDM symbol. The first OFDM symbol includes an extended PSS. The extended PSS is sequentially a first periodic extension, a low-frequency part, a DC carrier, a high-frequency part, and a second periodic extension in order of increasing frequency on the spectrum. The DC carrier is a subcarrier located at the center of the baseband. The first periodic extension and the high-frequency part carry the same data. The second periodic extension and the low-frequency part carry the same data. The wireless communication device acquires synchronization according to the extended PSS.

The disclosure provides a synchronization method of a carrier aggregation wireless network system. The wireless network system includes a first BS, a second BS, and a wireless communication device. A part of the coverage area of the first BS overlaps a part of the coverage area of the second BS. The synchronization method includes following steps. A first wireless signal is transmitted by the first BS. The first wireless signal includes a first subframe. The first subframe includes a first OFDM symbol and a second OFDM symbol. The first OFDM symbol includes a PSS, and the second OFDM symbol also includes the PSS. A second wireless signal is transmitted by the second BS. The second wireless signal includes a second subframe. The second subframe includes a plurality of OFDM symbols. One of the OFDM symbols of the second subframe that is corresponding to the first OFDM symbol includes the PSS. The wireless communication device acquires synchronization according to the PSS of the second OFDM symbol.

The disclosure provides a carrier aggregation wireless network system including a first BS, a second BS, and a wireless communication device. The first BS transmits a first wireless signal. The first wireless signal includes a first subframe. The first subframe includes a first OFDM symbol and a second OFDM symbol. The first OFDM symbol includes a PSS, and the second OFDM symbol also includes the PSS. The second BS transmits a second wireless signal. The second wireless signal includes a second subframe. The second subframe includes a plurality of OFDM symbols. One of the OFDM symbols of the second subframe that is corresponding to the first OFDM symbol includes the PSS. The wireless communication device acquires synchronization according to the PSS of the second OFDM symbol.

The disclosure provides a BS of a carrier aggregation wireless network system. The BS transmits a wireless signal. The wireless signal includes a subframe. The subframe includes a first OFDM symbol and a second OFDM symbol. The first OFDM symbol includes a PSS, and the second OFDM symbol also includes the PSS.

The disclosure provides a wireless communication device of a carrier aggregation wireless network system. The wireless communication device receives a wireless signal. The wireless signal includes a subframe. The subframe includes a first OFDM symbol and a second OFDM symbol. The first OFDM symbol includes a PSS, and the second OFDM symbol also includes the PSS. The wireless communication device acquires synchronization according to the PSS of second OFDM symbol.

The disclosure provides a synchronization method of a carrier aggregation wireless network system. The wireless network system includes a BS and a wireless communication device. The synchronization method includes following steps. A wireless signal is transmitted by the BS. The wireless signal includes a first cell having a first component carrier (CC) as its frequency band and a second cell having a second CC as its frequency band. The second cell includes a PSS and a secondary synchronization signal (SSS). A cell ID of the second cell is obtained by the wireless communication device according to the first cell. The wireless communication device is synchronized according to the cell ID and the PSS and the SSS of the second cell.

The disclosure provides a carrier aggregation wireless network system including a BS and a wireless communication device. The BS transmits a wireless signal. The wireless signal includes a first cell having a first CC as its frequency band and a second cell having a second CC as its frequency band. The second cell includes a PSS and a SSS. The wireless communication device obtains a cell ID of the second cell according to the first cell. The wireless communication device acquires synchronization according to the cell ID and the PSS and the SSS of the second cell.

The disclosure provides a wireless communication device of a carrier aggregation wireless network system. The wireless communication device receives a wireless signal. The wireless signal includes a first cell having a first CC as its frequency band and a second cell having a second CC as its frequency band. The second cell includes a PSS and a SSS. The wireless communication device obtains a cell ID of the second cell according to the first cell. The wireless communication device acquires synchronization according to the cell ID and the PSS and the SSS of the second cell.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
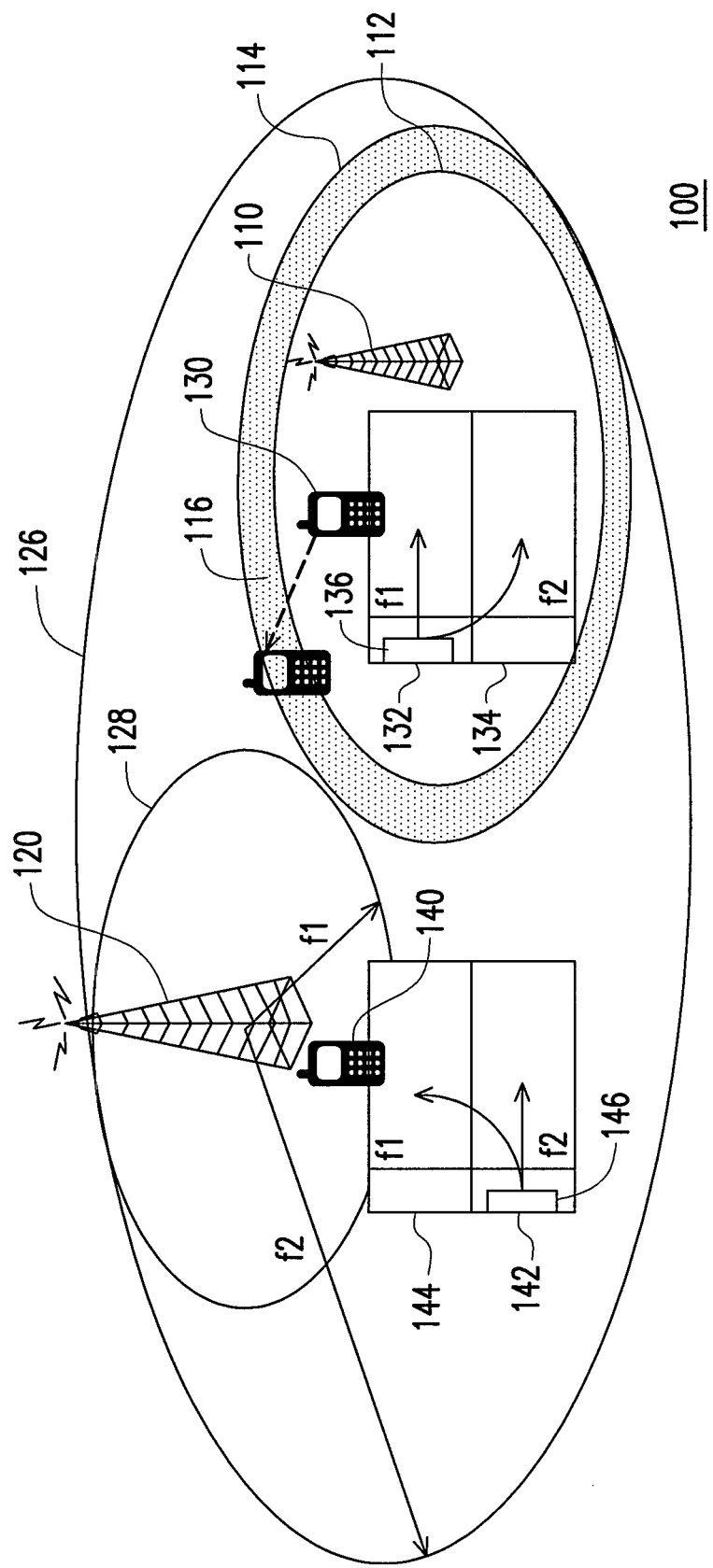
FIG. 1 is a diagram of a carrier aggregation wireless network system according to an embodiment of the disclosure.

Reference will now be made in detail to some embodiments of the disclosure, examples of which are illustrated in the accompanying drawings, wherein like reference numerals refer to the like elements throughout. These embodiments are described below in order to explain the disclosure but are not intended to limit the scope of the disclosure. To be specific, these embodiments are only examples of the systems and methods claimed by the disclosure.

FIG. 1 is a diagram of a carrier aggregation wireless network system according to an embodiment of the disclosure. The system is illustrated in FIG. 1 for the convenience of description but not intended to limit the scope of the disclosure. Referring to FIG. 1, the wireless network system 100 includes a first base station (BS) 110, a second BS 120, and wireless communication devices 130 and 140, etc. The first BS 110 may be a sub BS, and which may be a pico BS, a femto BS, a home BS, or any other type of BS. The second BS 120 may be a macro BS. Part of the coverage area of the first BS 110 overlaps part of the coverage area of the second BS 120. Herein "part of a coverage area" may refer to the entire coverage area or only a part of the coverage area. The wireless communication devices 130 and 140 are user equipments (UEs), such as cell phones, tablet computers, or notebook computers. In the present embodiment, the wireless network system 100 is a heterogeneous network system, the first BS 110 is a pico BS of a sub BS, and the second BS 120 is a macro BS. However, the disclosure is not limited thereto, and any other combination is within the scope of the disclosure. For example, the first BS 110 and the second BS 120 may both be macro BSs with overlapping coverage areas.

The first BS 110 emits or transmits a first wireless signal. The first wireless signal is a carrier aggregation wireless signal and at least includes a first component carrier (CC) and a second CC. Herein the frequency at the center of the baseband of the first CC is f1, and the frequency at the center of the baseband of the second CC is f2. In the present embodiment, the resources used by the wireless communication device 130 include the first CC and the second CC. Thus, when the first BS 110 serves as the access point of the wireless communication device 130, the first wireless signal includes a first cell 132 (for example, a primary cell (pcell)) having the first CC as its frequency band and a second cell 134 (for example, a secondary cell (scell)) having the second CC as its frequency band. The first cell 132 includes a physical downlink control channel (PDCCH) 136. The PDCCH 136 contains information related to the second cell 134 such that the wireless communication device 130 can read data from the second cell 134 accordingly. As mentioned above, the first cell 132 is a pcell and the second cell 134 is a scell. However, the disclosure is not limited thereto, and any other cell is also within the scope of the disclosure. For example, the second cell 134 may be a cell other than a scell.

Similarly, the second BS 120 emits or transmits a second wireless signal. The second wireless signal is also a carrier aggregation wireless signal and also includes at least two CCs having the frequencies f1 and f2 at the centers of the basebands thereof. In the present embodiment, the resources used by the wireless communication device 140 include these two CCs having the frequencies f1 and f2 at the centers of the basebands thereof. However, when the second BS 120 serves as the access point of the wireless communication device 140, the CC having the frequency f2 at the center of the baseband thereof carries a pcell 142, while the CC having the frequency f1 at the center of the baseband thereof carries a scell 144. Similarly, the pcell 142 includes a PDCCH 146, and the PDCCH 146 contains information related to the scell 144 such that the wireless communication device 140 can read data from the scell 144 accordingly.

As shown in FIG. 1, the second BS 120 uses the regular emission power when it emits the CC having the frequency f2 at the center of the baseband and offers a coverage area 126. However, to improve the transmission performance, the second BS 120 uses a lower emission power when it emits the CC having the frequency f1 at the center of the baseband and offers a coverage area 128. Thus, the coverage area 128 is much smaller than the coverage area 126. In the present embodiment, the first BS 110 is a sub BS with a relatively small emission power. Following expression is satisfied within the coverage area 112 illustrated in FIG. 1:

$$P_{1st} > P_{2nd} \tag{1}$$

Following expression is satisfied within the coverage area 114 illustrated in FIG. 1:

$$P_{1st} > P_{2nd} - P_{offset} \tag{2}$$

In foregoing expressions, $P_{1st}$ is the power of the wireless signal received from the first BS 110, $P_{2nd}$ P is the power of the wireless signal received from the second BS 120, and $P_{offset}$ is a predetermined power compensation value. The area inside the coverage area 114 but outside the coverage area 112 is referred to as a range extension (RE) 116 of the first BS 110. In FIG. 1, the overlapping between the coverage areas of the first BS 110 and the second BS 120 is not intended to limit the disclosure, and any other whole or partial overlapping between coverage areas is within the scope of the disclosure.

The wireless communication device 140 is located within the coverage area 128. Thus, when the second BS 120 serves as the access point of the wireless communication device 140, regarding a wireless signal of a CC having the frequency f2 at the center of the baseband, the power of the wireless signal received from the second BS 120 is much greater than the power of the wireless signal received from the first BS 110, and the wireless communication device 140 can easily acquire synchronization of the pcell 142 with the second BS 120. Similarly, the wireless communication device 140 can easily acquire synchronization of the scell 144 with the second BS 120.

The wireless communication device 130 is located within the coverage area 112. Thus, when the first BS 110 serves as the access point of the wireless communication device 130, regarding a wireless signal of a CC having the frequency f1 at the center of the baseband, the power of the wireless signal received from the first BS 110 is much greater than the power of the wireless signal received from the second BS 120, and the wireless communication device 130 can easily acquire synchronization of the pcell 132 with the first BS 110. In addition, regarding a wireless signal of the CC having the frequency f2 at the center of the baseband, because the power of the wireless signal received from the first BS 110 is greater than the power of the wireless signal received from the second BS 120 within the coverage area 112, the wireless communication device 130 can easily acquire synchronization of the scell 134 with the first BS 110. However, if the wireless communication device 130 is located within the RE 116 or moves from the coverage area 112 to the RE 116, because the second BS 120 uses relatively low emission power when it emits the CC having the frequency f1 at the center of the baseband, to the wireless signal of the CC having the frequency f1 at the center of the baseband, the power of the wireless signal received from the first BS 110 is still greater than the power of the wireless signal received from the second BS 120. Thus, the wireless communication device 130 can still acquire synchronization of the pcell 132 with the first BS 110. However, within the RE 116, regarding a wireless signal of the CC having the frequency f2 at the center of the baseband, the power of the wireless signal received from the first BS 110 is smaller than the power of the wireless signal received from the second BS 120, and due to interference or the distance between the CC having the frequency f1 at the center of the baseband and the CC having the frequency f2 at the center of the baseband, the wireless communication device 130 cannot acquire synchronization of the scell 134 with the first BS 110.

Figure 2A:
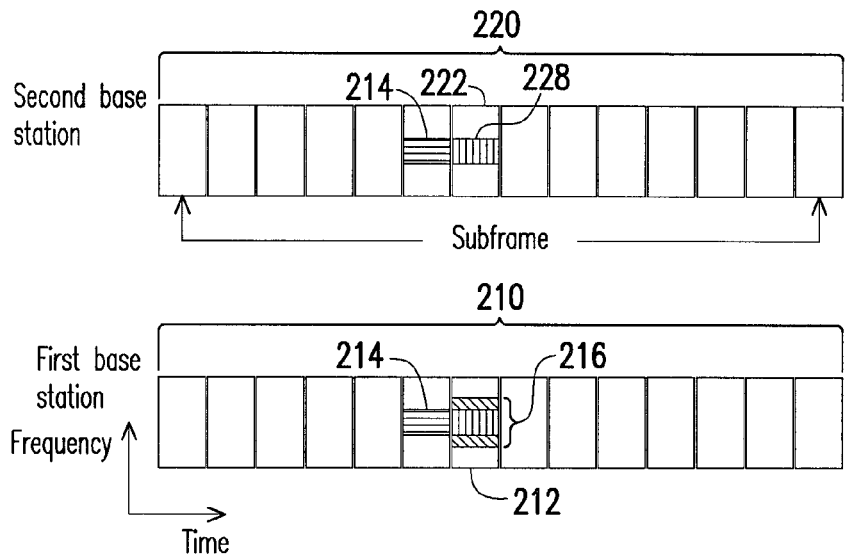
FIG. 2A is a resource allocation diagram of a carrier aggregation wireless network system working in a frequency-division duplexing (FDD) mode according to an embodiment of the disclosure.

FIG. 2A is a resource allocation diagram of a carrier aggregation wireless network system working in a frequency-division duplexing (FDD) mode according to an embodiment of the disclosure. The resource allocation is illustrated in FIG. 2A for the convenience of description but not intended to limit the scope of the disclosure. Referring to both FIG. 1 and FIG. 2A, the first BS 110 transmits a first wireless signal. As described above, the first wireless signal includes a second CC having a frequency f2 at the center of the baseband. The second CC carries a scell 134. The scell 134 includes a first subframe 210. The first subframe 210 includes a plurality of (for example, 14) orthogonal frequency-division multiplexing (OFDM) symbols. The OFDM symbols include a first OFDM symbol 212 (for example, the $7^{th}$ OFDM symbol is the first OFDM symbol 212). The first OFDM symbol 212 includes an extended primary synchronization signal (PSS) 216. Another OFDM symbol (for example, the $6^{th}$ OFDM symbol) of the first subframe 210 includes a secondary synchronization signal (SSS) 214.

The second BS 120 transmits a second wireless signal. The second wireless signal includes a CC having the frequency f2 at the center of the baseband. The CC carries a pcell 142. The pcell 142 includes a second subframe 220. The second subframe 220 includes a plurality of (for example, 14) OFDM symbols. One of the OFDM symbols that is corresponding to the first OFDM symbol 212 includes a PSS 228. Since the first OFDM symbol 212 is the $7^{th}$ OFDM symbol, the OFDM symbol corresponding to the first OFDM symbol 212 is also the $7^{th}$ OFDM symbol 222. Namely, the $7^{th}$ OFDM symbol 222 includes the PSS 228. Another OFDM symbol (for example, the $6^{th}$ OFDM symbol) of the second subframe 220 also includes the SSS 214.

Figure 2B:
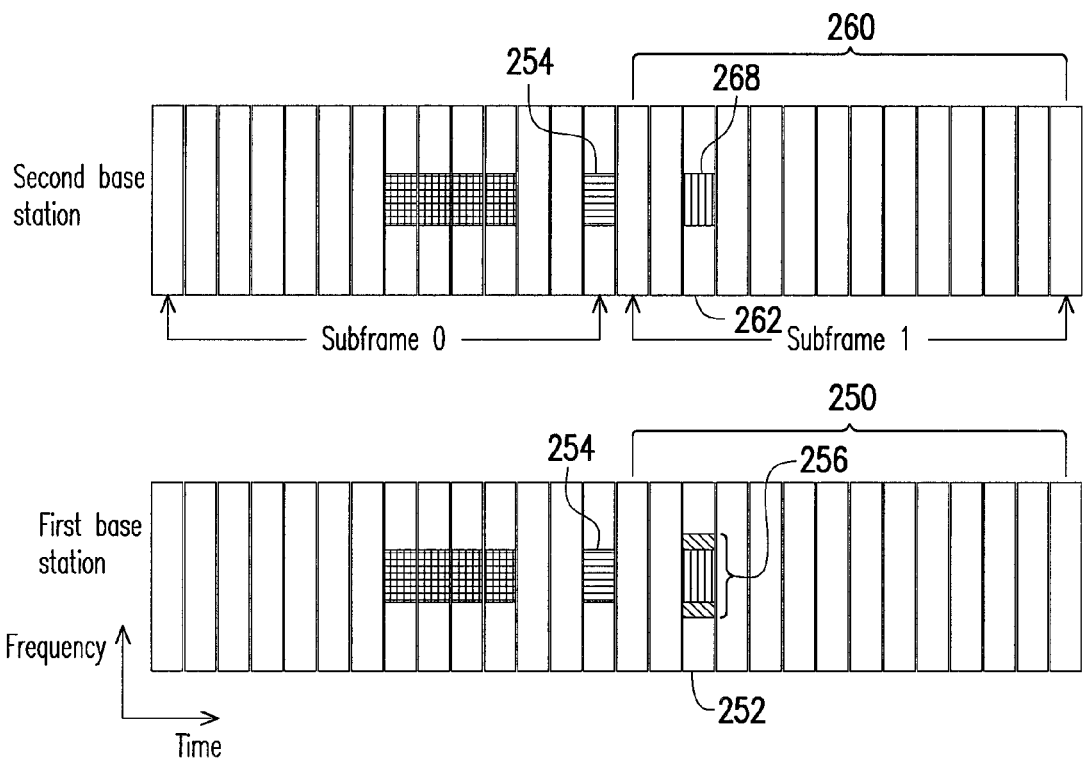
FIG. 2B is a resource allocation diagram of a carrier aggregation wireless network system working in a time-division duplexing (TDD) mode according to an embodiment of the disclosure.

FIG. 2B is a resource allocation diagram of a carrier aggregation wireless network system working in a time-division duplexing (TDD) mode according to an embodiment of the disclosure. The resource allocation is illustrated in FIG. 2B for the convenience of description but not intended to limit the scope of the disclosure. Please refer to both FIG. 1 and FIG. 2B. The embodiments illustrated in FIG. 2A and FIG. 2B show the difference between operations in the FDD mode and the TDD mode, and similar or same aspects in the two embodiments will not be described herein. In general, the first BS 110 transmits a first wireless signal. The first wireless signal includes a first subframe 250. The first subframe 250 includes a first OFDM symbol 252 (for example, the $3^{rd}$ OFDM symbol is the first OFDM symbol 252). The first OFDM symbol 252 includes an extended PSS 256. The second BS 120 transmits a second wireless signal. The second wireless signal includes a second subframe 260. The second subframe 260 includes a plurality of OFDM symbols. One of the OFDM symbols of the second subframe 260 that is corresponding to the first OFDM symbol 252 includes a PSS 268. Since the first OFDM symbol 252 is the $3^{rd}$ OFDM symbol, the OFDM symbol corresponding to the first OFDM symbol 252 is the $3^{rd}$ OFDM symbol 262. Namely, the $3^{rd}$ OFDM symbol 262 includes the PSS 268. In addition, in the present embodiment, the wireless network system works in the TDD mode, and a SSS 254 is configured in the last OFDM symbol of a subframe before the first subframe 250 and the second subframe 260.

Figure 3:
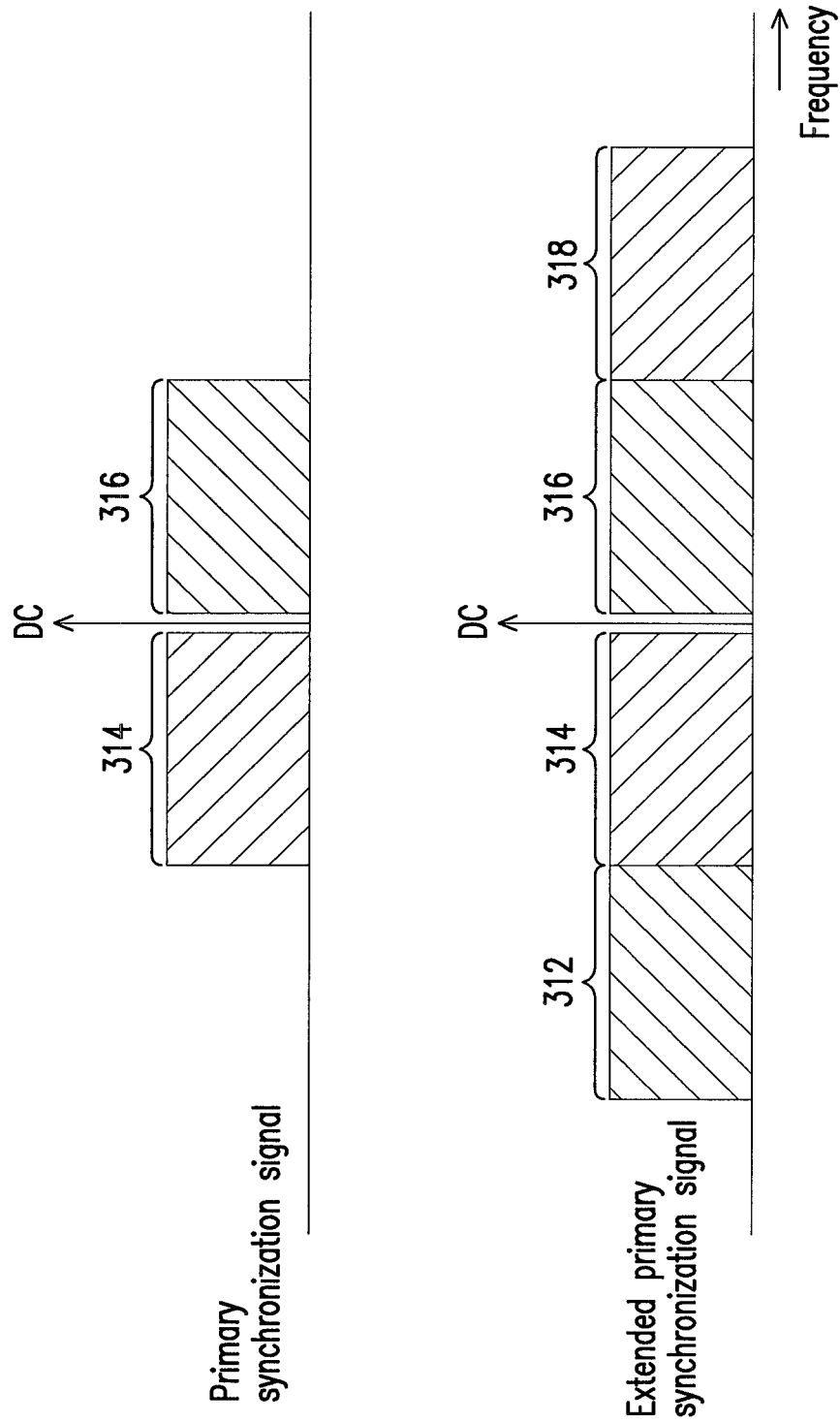
FIG. 3 is a spectrum diagram of an extended primary synchronization signal (PSS) and a PSS according to an embodiment of the disclosure.

FIG. 3 is a spectrum diagram of an extended primary synchronization signal (PSS) and a PSS according to an embodiment of the disclosure. The spectrum is illustrated in FIG. 3 for the convenience of description but not intended to limit the scope of the disclosure. Referring to FIG. 3, the extended PSS is sequentially a first periodic extension 312, a low-frequency part 314, a DC carrier, a high-frequency part 316, and a second periodic extension 318 in order of increasing frequency on the spectrum. The DC carrier is a subcarrier located at the center of the baseband, the first periodic extension 312 and the high-frequency part 316 carry the same data, and the second periodic extension 318 and the low-frequency part 314 carry the same data. The PSS is sequentially the low-frequency part 314, the DC carrier, and the high-frequency part 316 in order of increasing frequency on the spectrum.

Here the 3GPP Rel-10 standard will be taken as an example, and a PSS may be generated by using a Zadoff-Chu sequence $d_u(n)$ on a spectrum, as shown below:

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad (3)$$

In foregoing expression (3), u is a Zadoff-Chu root index, and the value thereof is shown in following table:

| $N_{ID}^{(2)}$ | Root Index u |
|---|---|
| 0 | 25 |
| 1 | 29 |
| 2 | 34 |

In foregoing table, $N_{ID}^{(2)}$ is an individual ID (which has 0, 1, or 2 as its value), and which is determined by the cell ID of the cell corresponding to the signal. The cell ID is equal to the cell group ID $N_{ID}^{(1)}$ times 3 and plus the individual ID $N_{ID}^{(2)}$. The cell group ID $N_{ID}^{(1)}$ has a value of any one among 0-167. The low-frequency part 314 and the high-frequency part 316 in the PSS have totally 6 resource blocks (RBs), and each RB has 12 subcarriers. Namely, there are totally 72 subcarriers. By removing the 5 blank (nil) low-frequency subcarriers from the left side, the 5 blank (nil) high-frequency subcarriers from the right side, and the DC carrier in the middle, a signal generated by using the Zadoff-Chu sequence is exactly mapped to the 62 subcarriers at the middle of the PSS.

The first periodic extension 312, the low-frequency part 314, the high-frequency part 316, and the second periodic extension 318 in the extended PSS have totally 12 RBs. Because the extended PSS has a signal sequence longer than general standard sequence, synchronization can be easily acquired by using the extended PSS even when interference exists. Besides, because the low-frequency part 314 and the high-frequency part 316 in the extended PSS are exactly the same as the low-frequency part 314 and the high-frequency part 316 in the PSS, the first periodic extension 312 and the high-frequency part 316 carry the same data, and the second periodic extension 318 and the low-frequency part 314 carry the same data, the technique in the disclosure is compatible to any general standard.

When the wireless communication device 130 is located within the RE 116, it receives both the first wireless signal and the second wireless signal. Regarding a wireless signal of the CC having the frequency f2 at the center of the baseband, the power of the wireless signal received from the first BS 110 is smaller than the power of the wireless signal received from the second BS 120. Thus, the wireless communication device 130 in seriously interfered and accordingly is unable to acquire synchronization of the scell 134 with the first BS 110. However, the wireless communication device 130 generates a synchronization preamble according to the extended PSS and performs a correlation operation on the synchronization preamble and the received wireless signal, so that the wireless communication device 130 can easily acquire synchronization of the scell 134 with the first BS 110 by using the result of the correlation operation. The technique in the disclosure is not limited to an application within the RE 116 and may also be applied to other areas without departing the scope of the disclosure.

Figure 4A:
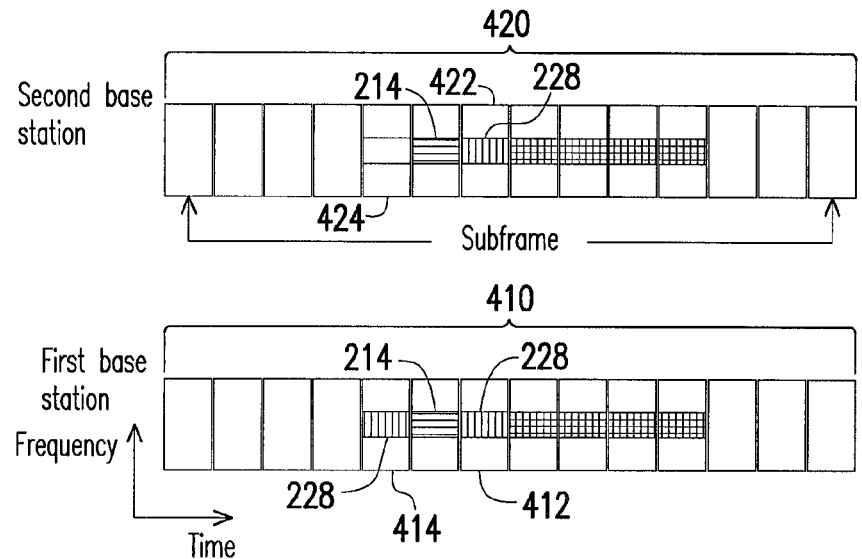
FIG. 4A is a resource allocation diagram of a carrier aggregation wireless network system working in a FDD mode according to another embodiment of the disclosure.

FIG. 4A is a resource allocation diagram of a carrier aggregation wireless network system working in a FDD mode according to another embodiment of the disclosure. The resource allocation is illustrated in FIG. 4A for the convenience of description but not intended to limit the scope of the disclosure. Referring to both FIG. 1 and FIG. 4A, as described above, the first BS 110 transmits a first wireless signal. The first wireless signal includes a second CC having the frequency f2 at the center of the baseband. The second CC carries a scell 134. The scell 134 includes a first subframe 410. The first subframe 410 includes a plurality of (for example, 14) OFDM symbols. The OFDM symbols include a first OFDM symbol 412 and a second OFDM symbol 414. For example, the $5^{th}$ OFDM symbol is the second OFDM symbol 414, and the $7^{th}$ OFDM symbol is the first OFDM symbol 412. The first OFDM symbol 412 includes a PSS 228, and the second OFDM symbol 414 also includes the PSS 228. The first subframe 410 further includes another OFDM symbol (for example, the $6^{th}$ OFDM symbol). This another OFDM symbol includes a SSS 214.

The second BS 120 transmits a second wireless signal. The second wireless signal includes a CC having the frequency f2 at the center of the baseband. The CC carries a pcell 142. The pcell 142 includes a second subframe 420. The second subframe 420 includes a plurality of (for example, 14) OFDM symbols. One of the OFDM symbols that is corresponding to the first OFDM symbol 412 includes the PSS 228. Because the first OFDM symbol 412 is the $7^{th}$ OFDM symbol, the OFDM symbol corresponding to the first OFDM symbol 412 is also the $7^{th}$ OFDM symbol 422. Namely, the $7^{th}$ OFDM symbol 422 includes the PSS 228. Another OFDM symbol (for example, the $6^{th}$ OFDM symbol) of the second subframe 420 also includes the SSS 214.

Figure 4B:
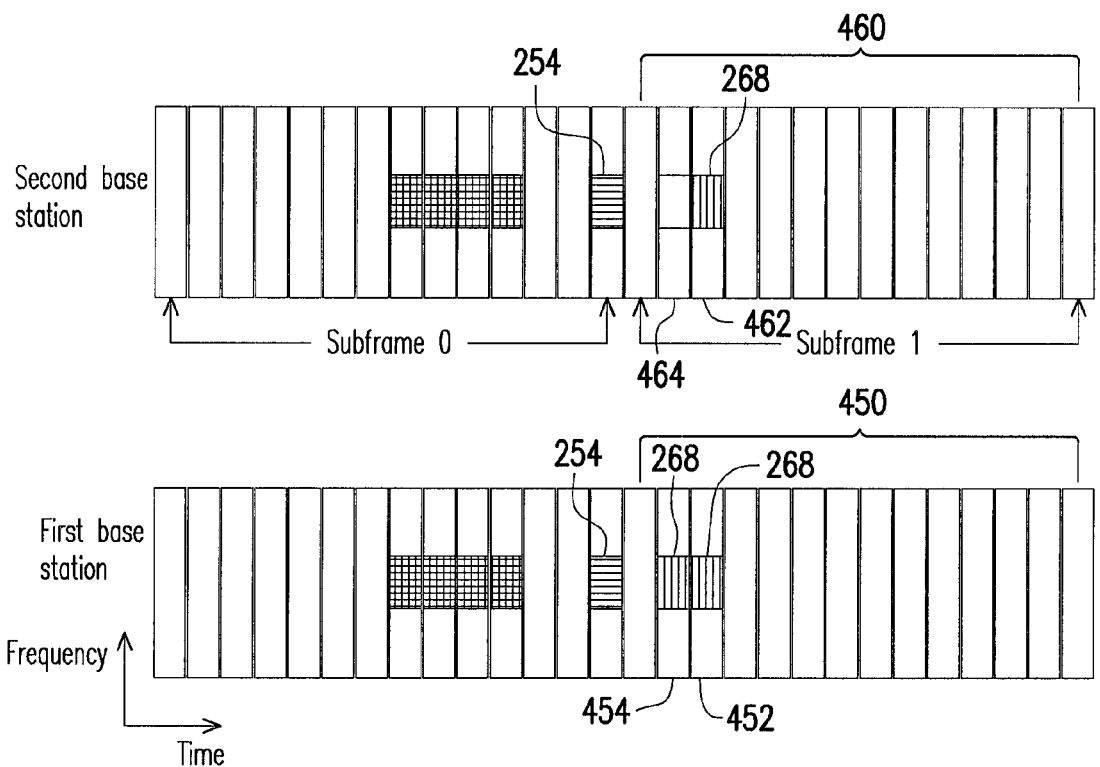
FIG. 4B is a resource allocation diagram of a carrier aggregation wireless network system working in a TDD mode according to another embodiment of the disclosure.

FIG. 4B is a resource allocation diagram of a carrier aggregation wireless network system working in a TDD mode according to another embodiment of the disclosure. The resource allocation is illustrated in FIG. 4B for the convenience of description but not intended to limit the scope of the disclosure. Please Refer to both FIG. 1 and FIG. 4B. The embodiments illustrated in FIG. 4A and FIG. 4B show the difference between operations in the FDD mode and the TDD mode, and similar or same aspects of the two embodiments will not be described herein. In general, the first BS 110 transmits a first wireless signal. The first wireless signal includes a first subframe 450. The first subframe 450 includes a first OFDM symbol 452 and a second OFDM symbol 454. For example, the $2^{nd}$ OFDM symbol is the second OFDM symbol 454, and the $3^{rd}$ OFDM symbol is the first OFDM symbol 452. The first OFDM symbol 452 includes a PSS 268, and the second OFDM symbol 454 also includes the PSS 268. The second BS 120 transmits a second wireless signal. The second wireless signal includes a second subframe 460. The second subframe 460 includes a plurality of OFDM symbols. One of the OFDM symbols of the second subframe 460 that is corresponding to the first OFDM symbol 452 includes the PSS 268. Because the first OFDM symbol 452 is the $3^{rd}$ OFDM symbol, the OFDM symbol corresponding to the first OFDM symbol 452 is also the $3^{rd}$ OFDM symbol 462. Namely, the $3^{rd}$ OFDM symbol 462 includes the PSS 268. In addition, in the present embodiment, the wireless network system works in the TDD mode, and the SSS 254 is configured in the last OFDM symbol of the subframe before the first subframe 450 and the second subframe 460.

The wireless communication device 130 is located within a RE 116, and which receives both the first and the second wireless signal. Regarding a wireless signal of the CC having the frequency f2 at the center of the baseband, the power of the wireless signal received from the first BS 110 is smaller than the power of the wireless signal received from the second BS 120. If the wireless communication device 130 acquires synchronization of the scell 134 by using only the PSS of the first OFDM symbol, since the OFDM symbol in the wireless signal emitted by the second BS 120 that is corresponding to the first OFDM symbol also includes the PSS, the wireless communication device 130 is seriously interfered. In this case, the wireless communication device 130 acquires synchronization of the scell 134 with the first BS 110 by using the PSS of the second OFDM symbol, so that aforementioned interference problem can be easily resolved. The technique in the disclosure is not limited to an application within the RE 116 and may also be applied to other areas without departing the scope of the disclosure.

Referring to FIG. 4A again. One of the OFDM symbols of the second subframe 420 that is corresponding to the second OFDM symbol 414 includes a frequency band carrying blank data. Because the second OFDM symbol 414 is the $5^{th}$ OFDM symbol, the OFDM symbol corresponding to the second OFDM symbol 414 is also a $5^{th}$ OFDM symbol 424. To be specific, data on the frequency band of the spectrum of the OFDM symbol 424 that is the same as the frequency band of the PSS of the second OFDM symbol 414 is nil. Namely, the second BS 120 does not emit data or uses a relatively low emission power on the same frequency band at the same time point. Thus, the wireless communication device 130 can acquire synchronization of the scell 134 by using the PSS 228 of the second OFDM symbol.

Referring to FIG. 4B again, one of the OFDM symbols of the second subframe 460 that is corresponding to the second OFDM symbol 454 includes a frequency band carrying blank data. Because the second OFDM symbol 454 is the $2^{nd}$ OFDM symbol, the OFDM symbol corresponding to the second OFDM symbol 454 is also a $2^{nd}$ OFDM symbol 464. To be specific, data on the frequency band of the spectrum of the OFDM symbol 464 that is the same as the frequency band of the PSS of the second OFDM symbol 454 is nil. Namely, the second BS 120 does not emit data or uses a relatively low emission power on the same frequency band at the same time.

Thus, the wireless communication device 130 can acquire synchronization of the scell 134 by using the PSS 268 of the second OFDM symbol.

In the embodiments illustrated in FIG. 4A and FIG. 4B, one of the OFDM symbols of the second subframe that is corresponding to the second OFDM symbol includes a blank frequency band. However, the disclosure is not limited thereto, and this blank frequency band may also be allocated as usable resource for downlink transmitting actual data.

The embodiment illustrated in 2A and FIG. 4A or in FIG. 2B and FIG. 4B is technically independent. However, the disclosure is not limited thereto. In an actual application, the technique illustrated in FIG. 2A and FIG. 4A and the technique illustrated in FIG. 2B and FIG. 4B may coexist in a carrier aggregation wireless network system to ensure the acquisition of synchronization.

Figure 5:
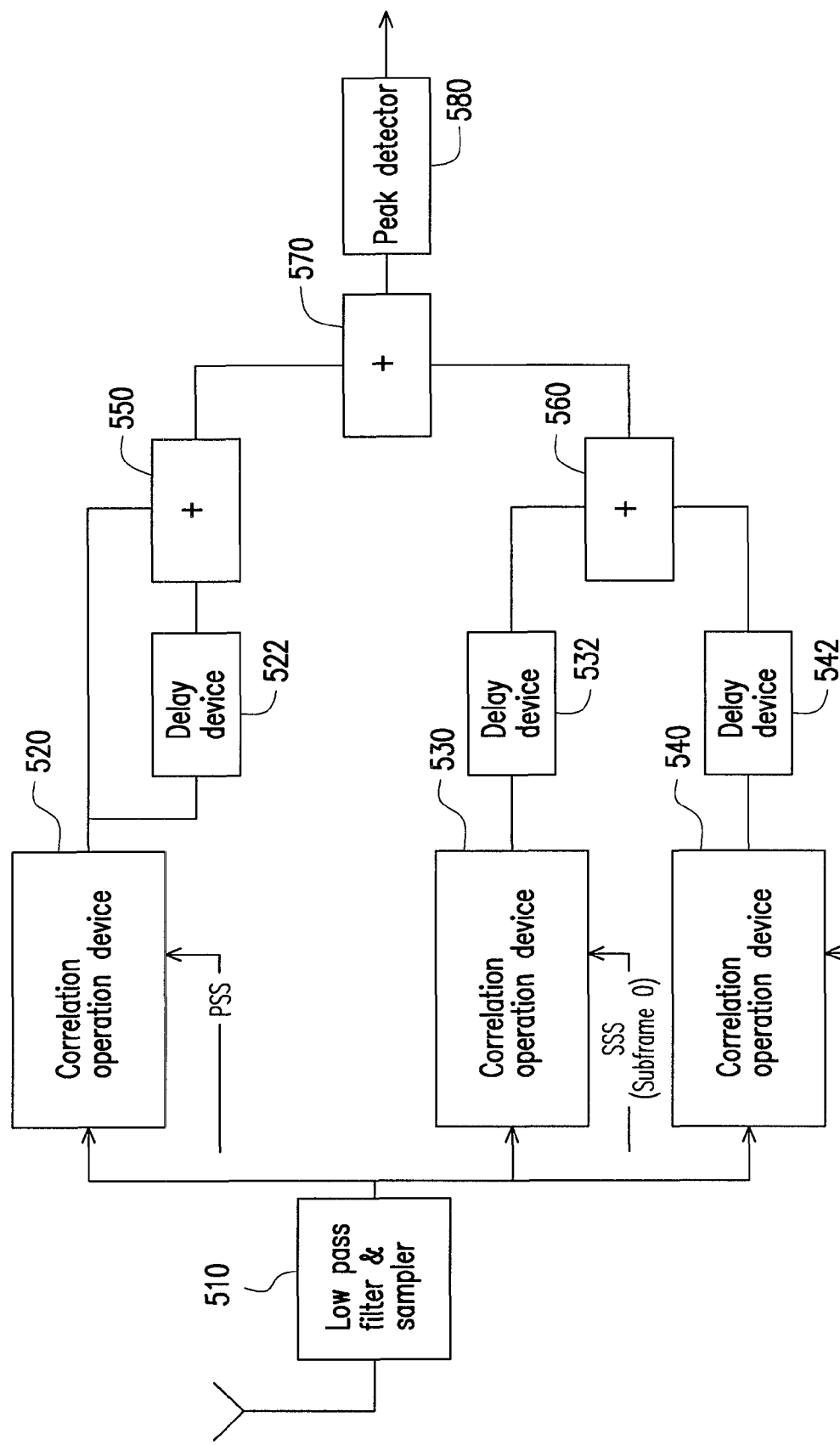
FIG. 5 is a block diagram illustrating synchronization-related functions of a wireless communication device of a carrier aggregation wireless network system according to yet another embodiment of the disclosure.

FIG. 5 is a block diagram illustrating synchronization-related functions of a wireless communication device of a carrier aggregation wireless network system according to yet another embodiment of the disclosure. The device is illustrated in FIG. 5 for the convenience of description but not intended to limit the scope of the disclosure. Referring to both FIG. 1 and FIG. 5, the wireless communication device 130 includes a low-pass filter & sampler 510, correlation operation devices 520, 530, and 540, delay devices 522, 532, and 542, adders 550, 560, and 570, and a peak detector 580.

As described above, the first BS 110 emits a first wireless signal. The first wireless signal includes a first cell 132 (for example, a pcell) having a first CC as its frequency band and a second cell 134 (for example, a scell) having a second CC as its frequency band. The first cell 132 includes a PDCCH 136, and the PDCCH 136 contains information related to the second cell 134 (for example, a cell ID of the second cell 134). The wireless communication device 130 can easily acquire synchronization of the first cell 132. Thus, the wireless communication device 130 can obtain the individual ID and cell group ID of the second cell 134 according to the first cell 132.

The second cell 134 includes a PSS and a SSS. The PSS depends on an individual ID of the second cell 134, and the SSS depends on a cell group ID of the second cell 134. Thus, after obtaining the individual ID and cell group ID of the second cell 134, the wireless communication device 130 can acquire synchronization of the second cell 134 according to the cell group ID, the PSS and the SSS of the second cell 134.

For example, the cell group ID has 168 possible values (0-167), the individual ID has 3 possible values (0, 1, and 2). The cell group ID of the second cell 134 can be obtained from BS 110 or BS 120. The wireless communication device 130 can acquire synchronization according to a PSS sequence similar to a synchronization preamble, generate a SSS sequence according to the cell group ID, and acquire synchronization by using the SSS sequence. Namely, the wireless communication device performs a correlation operation on the SSS sequence and the SSS of the received wireless signal, performs a correlation operation on the PSS sequence and the PSS of the received wireless signal, and acquires synchronization by using the results of the correlation operations.

After the wireless communication device 130 receives the wireless signal, the low-pass filter & sampler 510 filters the wireless signal to remove carriers and sample the wireless signal. The correlation operation device 520 performs a correlation operation on the sampled signal and the PSS sequence. The correlation operation devices 530 and 540 perform a correlation operation on the sampled signal and the SSS sequence. To add up the operation results, the operation results are respectively delayed for different time periods by the delay devices 522, 532, and 542. After the delayed signals are added up by the adders 550, 560, and 570, the time points of the peaks are detected by the peak detector 580 to acquire synchronization. Namely, synchronization of the scell 134 can be easily acquired with the first BS 110 by using aforementioned operation results.

In the embodiment illustrated in FIG. 5, the two correlation operation devices 530 and 540 are adopted for respectively performing correlation operations on the SSS of the subframe 0 and the SSS of the subframe 1. However, the disclosure is not limited thereto, and a single correlation operation device may also be adopted. For example, a wireless network system working in the FDD mode is a typical example.

As described above, a wireless communication device can always acquire synchronization according to an extended PSS and/or a PSS of a second OFDM symbol even if the wireless communication device is located within a RE with serious interference. In addition, the wireless communication device may also acquire synchronization according to a cell ID, a PSS, and a SSS.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A synchronization method of a carrier aggregation wireless network system, wherein the wireless network system comprises a first base station (BS), a second BS, and a wireless communication device, and a part of a coverage area of the first BS overlaps a part of a coverage area of the second BS, the synchronization method comprising:

transmitting a first wireless signal by using the first BS, wherein the first wireless signal comprises a first subframe, the first subframe comprises a first orthogonal frequency-division multiplexing (OFDM) symbol, the first OFDM symbol comprises an extended primary synchronization signal (PSS), the extended PSS is sequentially a first periodic extension, a low-frequency part, a DC carrier, a high-frequency part, and a second periodic extension in order of increasing frequency on a spectrum, the DC carrier is a subcarrier located at a center of a baseband, the first periodic extension and the high-frequency part carry a same data, and the second periodic extension and the low-frequency part carry a same data;

transmitting a second wireless signal by using the second BS, wherein the second wireless signal comprises a second subframe, the second subframe comprises a plurality of OFDM symbols, one of the OFDM symbols of the second subframe that is corresponding to the first OFDM symbol comprises a PSS, and the PSS is sequentially the low-frequency part, the DC carrier, and the high-frequency part in order of increasing frequency on the spectrum; and acquiring synchronization by the wireless communication device according to the extended PSS.

2. The synchronization method according to claim 1, wherein the wireless network system is a heterogeneous network system, the first BS is a pico BS, and the second BS is a macro BS.

3. A carrier aggregation wireless network system, comprising: a receiver, wherein a first BS, transmitting a first wireless signal, wherein the first wireless signal comprises a first subframe, the first subframe comprises a first OFDM symbol, the first OFDM symbol comprises an extended PSS, the extended PSS is sequentially a first periodic extension, a low-frequency part, a DC carrier, a high-frequency part, and a second periodic extension in order of increasing frequency on a spectrum, the DC carrier is a subcarrier located at a center of a baseband, the first periodic extension and the high-frequency part carry a same data, and the second periodic extension and the low-frequency part carry a same data; a second BS, transmitting a second wireless signal, wherein the second wireless signal comprises a second subframe, the second subframe comprises a plurality of OFDM symbols, one of the OFDM symbols of the second subframe that is corresponding to the first OFDM symbol comprises a PSS, mad the PSS is sequentially the low-frequency part, the DC carrier, and the high-frequency part in order of increasing frequency on the spectrum; and a wireless communication device, acquiring synchronization according to the extended PSS.

4. The carrier aggregation wireless network system according to claim 3, wherein the wireless network system is a heterogeneous network system, the first BS is a pico BS, and the second BS is a macro BS.

5. A carrier aggregation wireless network system, comprising:
    a transmitter, wherein
    a base station (BS) including the transmitter is configured to transmit via the transmitter, on a first component carrier (CC), a first wireless signal, the wireless signal comprises a first subframe, the first subframe comprises a first orthogonal frequency-division multiplexing (OFDM) symbol, the first OFDM symbol comprises an extended primary synchronization signal (PSS), the extended PSS is sequentially a first periodic extension, a low-frequency part, a direct current (DC) carrier, a high-frequency part, and a second periodic extension in order of increasing frequency on a spectrum, the DC carrier is a subcarrier located at a center of a baseband, the first periodic extension and the high-frequency part carry a same data, and the second periodic extension and the low-frequency part carry a same data; and
    a wireless user device that comprises a receiver acquires via the receiver synchronization to the first component-carrier (CC) according to the transmitted extended PSS that is included in the wireless signal.

6. The system according to claim 5, wherein the BS including the transmitter is further configured to transmit, on a second CC, a a second subframe that comprises a second OFDM symbol, the second OFDM symbol comprises a PSS, and the PSS is sequentially the low-frequency part, the DC carrier, and the high-frequency part in order of increasing frequency on the spectrum.

7. A wireless communication device of a carrier aggregation wireless network system comprising:
    a receiver, wherein
    the wireless communication device including the receiver is configured to receive a first wireless signal, the first wireless signal comprises a first subframe, the first subframe comprises a first orthogonal frequency-division multiplexing (OFDM) symbol, the first OFDM symbol comprises an extended primary synchronization signal (PSS), the extended PSS is sequentially a first periodic extension, a low-frequency part, a DC carrier, a high-frequency part, and a second periodic extension in order of increasing frequency on a spectrum, the DC carrier is a subcarrier located at a center of a baseband, the first periodic extension and the high-frequency part carry a same data, the second periodic extension and the low-frequency part carry a same data, the wireless communication device via the receiver receives a second wireless signal that comprises a second subframe, the second subframe comprises a plurality of OFDM symbols, one of the OFDM symbols of the second subframe that is corresponding to the first OFDM symbol comprises a PSS, and the PSS is sequentially the low-frequency part, the DC carrier, and the high frequency part in order of increasing frequency on the spectrum, and the wireless communication device acquires synchronization via the receiver according to the extended PSS.

8. A synchronization method of a carrier aggregation wireless network system, wherein the wireless network system comprises a first base station (BS), a second BS, and a wireless communication device, and a part of a coverage area of the first BS overlaps a part of a coverage area of the second BS, the synchronization method comprising:
    transmitting a first wireless signal by using the first BS, wherein the first wireless signal comprises a first subframe, the first subframe comprises a first orthogonal frequency division multiplexing (OFDM) symbol and a second OFDM symbol, the first OFDM symbol comprises a primary synchronization signal (PSS), and the second OFDM symbol comprises the PSS;
    transmitting a second wireless signal by using the second BS, wherein the second wireless signal comprises a second subframe, the second subframe comprises a plurality of OFDM symbols, and one of the OFDM symbols of the second subframe that is corresponding to the first OFDM symbol comprises the PSS, and one of the OFDM symbols of the second subframe that is corresponding to the first OFDM symbol carries a nil data on a frequency band that is the same as a frequency band of the PSS of the second OFDM symbol; and
    acquiring synchronization by the wireless communication device according to the PSS of the second OFDM symbol.

9. The synchronization method according to claim 8, wherein the wireless network system is a heterogeneous network system, the first BS is a pico BS, and the second BS is a macro BS.

10. A carrier aggregation wireless network system, comprising: a transmitter and a receiver, wherein a first base station (BS), transmitting a first wireless signal, wherein the first wireless signal comprises a first component carrier of a secondary cell, and the first component carrier comprises a first subframe, the first subframe comprises a first orthogonal frequency-division multiplexing (OFDM) symbol and a second OFDM symbol, the first OFDM symbol comprises a primary synchronization signal (PSS), and the second OFDM symbol comprises the PSS; and a second BS, transmitting a second wireless signal, wherein the second wireless signal comprises a second component carrier of a primary cell, and the second component carrier comprises a second subframe, the second subframe comprises a plurality of OFDM symbols, and one of the OFDM symbols of the second subframe that is corresponding to the first OFDM symbol comprises the PSS, and one of the OFDM symbols of the second subframe that is corresponding to the first OFDM symbol carries a nil data on a frequency band that is the same as a frequency band of the PSS of the second OFDM symbol.

11. A base station (BS) of a carrier aggregation wireless network system, comprising: a transmitter, wherein the BS via the transmitter is configured to transmit a first wireless signal that comprises a first component carrier, and the first component carrier comprises a first subframe that comprises a first orthogonal frequency-division multiplexing (OFDM)

symbol and a second OFDM symbol, the first OFDM symbol comprises a primary synchronization signal (PSS), and the second OFDM symbol comprises the PSS; to the first component carrier (CC), the BS via the transmitter also transmits the second wireless signal that comprises a second component carrier, and the second component carrier comprises a second subframe that comprises a plurality of OFDM symbols, and one of the OFDM symbols of the second subframe that is corresponding to the first OFDM symbol carries a nil data on a frequency band that is the same as a frequency band of the PSS of the second OFDM symbol.

12. A wireless communication device of a carrier aggregation wireless network system comprising:
  a transmitter and a receiver, wherein
  the wireless communication device via the receiver is configured to acquire synchronization according to the primary synchronization signal (PSS) of the second orthogonal frequency division multiplexing (OFDM) symbol in response to receiving both a first wireless signal and a second wireless signal, wherein the first wireless signal is transmitted from a first base station (BS) to be received via the receiver and comprises a first component carrier of a secondary cell, and the first component carrier (CC) comprises a first subframe, the first subframe comprises a first OFDM symbol and a second OFDM symbol, the first OFDM symbol comprises a primary synchronization signal (PSS), and the second OFDM symbol comprises the PSS, and wherein the second wireless signal is transmitted from a second base station to be received via the receiver and comprises a second component carrier of a primary cell, and the second component carrier comprises a second subframe, the second subframe comprises a plurality of OFDM symbols, and one of the OFDM symbols of the second subframe that is corresponding to the first OFDM symbol comprises the PSS carries a nil data on a frequency band that is the same as a frequency band of the PSS of the second OFDM symbol.

\* \* \* \* \*